(12) United States Patent
Haensgen et al.

(10) Patent No.: US 7,965,478 B2
(45) Date of Patent: Jun. 21, 2011

(54) SYSTEM AND METHOD FOR DETECTING A FAULT CONDITION

(75) Inventors: Steven T. Haensgen, Mukwonago, WI (US); William H. Martin, Franklin, WI (US); Ricky A. Hurley, Hendersonville, NC (US); Ronald N. Jansen, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 169 days.

(21) Appl. No.: 12/493,993

(22) Filed: Jun. 29, 2009

(65) Prior Publication Data
US 2010/0328825 A1 Dec. 30, 2010

(51) Int. Cl.
*H02H 3/00* (2006.01)
(52) U.S. Cl. .......................................... 361/47; 361/42

(58) Field of Classification Search .............. 361/42–50; 700/292, 293
See application file for complete search history.

(56) References Cited

U.S. PATENT DOCUMENTS

| | | | |
|---|---|---|---|
| 6,005,393 A | * | 12/1999 | Baumgartl .................... 324/509 |
| 6,167,329 A | * | 12/2000 | Engel et al. ................. 361/93.2 |
| 6,459,557 B1 | | 10/2002 | Haensgen et al. |

* cited by examiner

*Primary Examiner* — Danny Nguyen
(74) *Attorney, Agent, or Firm* — Fletcher Yoder LLP; William R. Walbrun; John M. Miller

(57) ABSTRACT

A system and method for detecting a fault condition by a relay is provided. The system includes means for detecting phase currents through three electrical phases, means for detecting a ground fault current, a processor configured to perform a current-based function based upon at least one of the phase currents and a filter. The processor is configured to perform current-based functions based on whether the filter is enabled or disabled.

33 Claims, 3 Drawing Sheets

SYSTEM AND METHOD FOR DETECTING A FAULT CONDITION

BACKGROUND

The invention relates generally to multi-phase power systems and more specifically to a system and method for judiciously tripping or not tripping a relay in the event of a fault condition.

Single-phase and multi-phase (e.g., three-phase) power systems typically include an overload relay and a contactor, with the intention of interrupting power in power conductors when a fault condition occurs. These fault conditions may include, for example overcurrent, a ground fault, phase loss or undercurrent. A variety of types of overload relays are available, ranging from eutectic overload relays to more complex, solid-state overload relays which may include some intelligence and/or reporting capabilities.

Solid-state overload relays include electronic devices for monitoring phase current and for determining, based on the monitored current, whether a fault condition has occurred. Thus, such overload relays typically can be configured to provide protection for downstream circuitry or equipment in the event of various fault conditions. On detecting a fault current, the solid-state overload relay trips and opens the contactor, thus interrupting power to the power system components downstream.

In many systems, overload relays are configured to sense both a line current and a ground fault current. Typically, when a ground fault current is sensed, it is manifested as component of the line current. In some cases, the ground fault protection can be disabled or the ground fault current can be small enough such that a ground fault trip does not occur. However, in other cases, the ground fault current can be significant enough to cause the solid-state overload relay to trip without the existence of a real fault condition. Such instances are generally referred to as "nuisance trips" and result in interruption of power supply to power system. Even with relatively sophisticated relays employing processing circuitry, such nuisance trips can be problematic, and can cause time and material loss in industrial, commercial and other processes.

Therefore, there is a need for accurately detecting a fault condition and avoiding the occurrence of nuisance trips that result in the interruption of power to the power system.

BRIEF DESCRIPTION

Briefly, according to one embodiment of the invention, a method for controlling an electrical load is provided. The method comprises detecting a plurality of phase currents through a relay, detecting a ground fault current through the relay and performing a current-based function based upon at least the highest phase current if a ground fault current is at or below a threshold, and performing the current-based function without the highest phase current if a ground fault current is above the threshold.

In another embodiment, a method for controlling an electrical load is provided. The method comprises detecting a plurality of phase currents through a relay, detecting a ground fault current through the relay, determining a vector magnitude and phase angle of a phase current increased by the ground fault current. The method further comprises determining a vector magnitude and phase angle of the ground fault current and correcting the phase current increased by the ground fault current by a vector operation based upon the determined vector magnitudes and phase angles.

In another embodiment, an electrical load control system is provided comprising means for detecting phase currents through three electrical phases, means for detecting a ground fault current and a processor configured to perform a current-based function based upon at least one of the phase currents. The electrical load control system further comprises a filter configured to cause the processor, in performing the current-based function, to use a phase current increased by the ground fault current when the filter is not enabled, and to cause the processor not to use the phase current increased by the ground fault current when the ground fault current is at or above a threshold value and the filter is enabled.

In another embodiment, an electrical load control system is provided, comprising means for detecting phase currents through three electrical phases, means for detecting a ground fault current, and a processor. The processor is configured to determine a vector magnitude and phase angle of a phase current increased by the ground fault current, determine a vector magnitude and phase angle of the ground fault current and correct the phase current increased by the ground fault current by a vector operation based upon the determined vector magnitudes and phase angles. The electrical load system further comprises a filter configured to cause the processor, to perform the current-based function when enabled.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
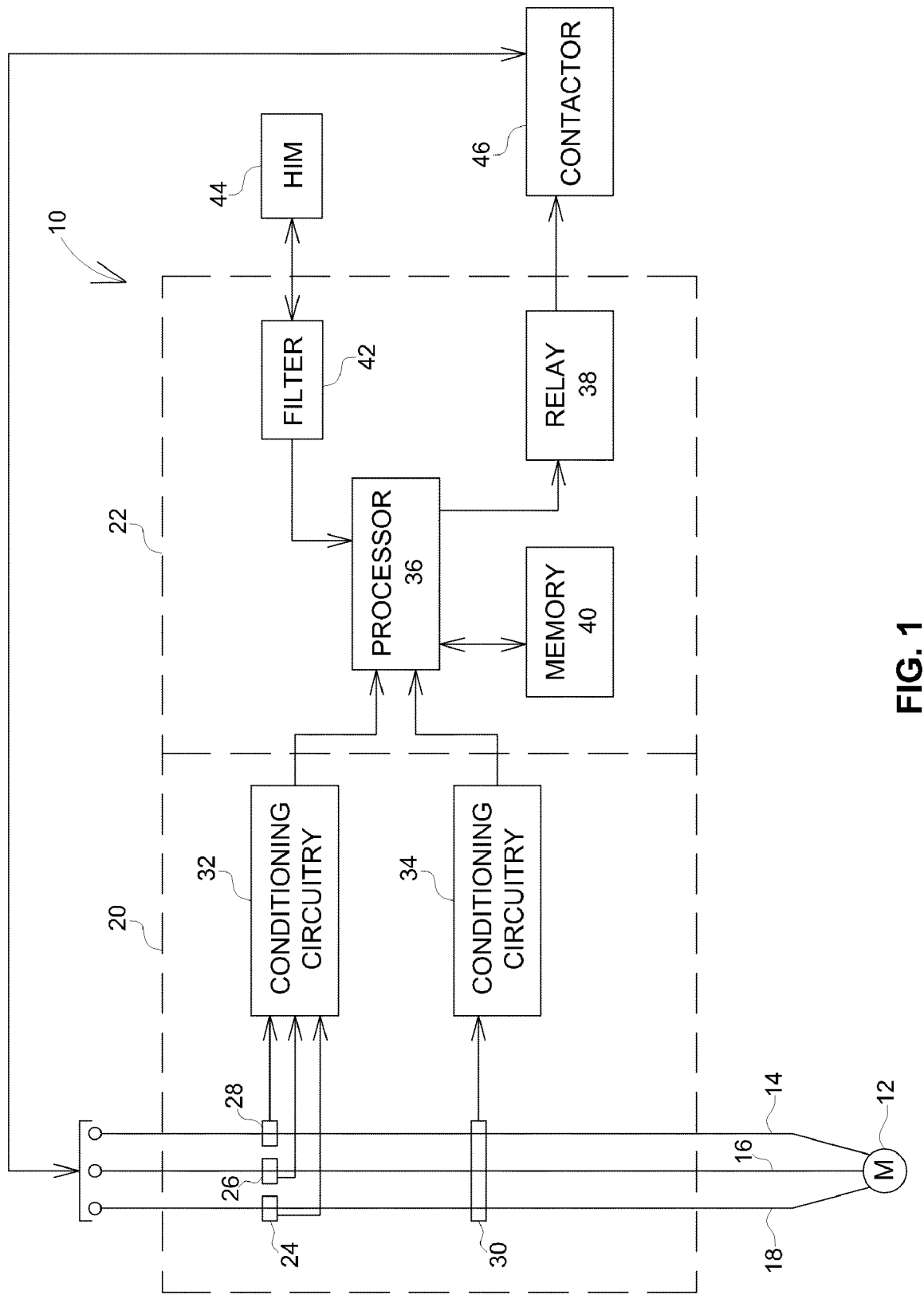
FIG. 1 is a block diagram of one embodiment of an overload relay implemented according to one aspect of the invention.

Turning now to the drawings, and referring first to FIG. 1, an overload relay 10 for monitoring and interrupting current flow provided to a motor 12 by power conductors 14, 16 and 18 is illustrated. The overload relay is selectively operable in a single-phase mode of operation or a multi-phase mode of operation and is configured to sense current flow through power conductors. Relay 10 includes a sensing module 20 and a processing module 22. Each block is described in further detail below.

Sensing module 20 includes sensors 24, 26, 28 and 30, and conditioning circuitry 32 and 34. Sensors 24, 26 and 28 are coupled individually to the power conductors 14, 16 and 8 respectively and sensor 30 is coupled to the three power conductors. In one embodiment, sensors 24, 26 and 28 are Hall effect sensors.

Sensors 24, 26 and 28 are configured to monitor the current flow in power conductors 14, 16 and 18, respectively, and provide output signals representative of the individual phase currents to conditioning circuitry 32. Sensor 30 is configured to simultaneously monitor the current flow in all three power conductors and provide an output signal representative of a vector sum of the phase currents (normally a null signal if all phases are balanced). The output signal from sensor 30 is provided to conditioning circuitry 34. Conditioning circuitry 32 and 34 are configured to appropriately condition (e.g., filter, amplify, convert, etc.) the sensor output signals for compatibility with the processor 34 in processing module 22.

Processing module 22 includes processor 36, relay 38, memory 40 and filter 42. Processor 36 is configured to execute a variety of processing and control functions in accordance with programs stored in memory 40 and based on inputs received from conditioning circuitry 32 and 34 and parameters received through human interface module 44. In one embodiment, the processor is configured to perform a current-based function based upon the phase currents detected by the sensors 24, 26, 28 and 30. Examples of current-based functions include phase loss analysis, current imbalance analysis, overload current analysis or overcurrent analysis. Each of these functions may be of a type generally known in the art.

Filter 42 is coupled to the processor 36 and may be enabled or disabled as desired. The processor is configured to perform a corresponding current-based function based on whether the filter 42 is enabled or disabled. In one embodiment, when the filter is disabled, the processor is configured to use a phase current increased by the ground fault current to perform the current-based function.

When the filter is enabled, and when the ground fault current is at or above a threshold, the processor is configured to perform a current-based function without using the phase current increased by the ground fault current. The threshold may be configured using the human interface module 44. In one embodiment, the processor is configured to use the second highest phase current for performing the current-based function.

In another embodiment, when the filter is enabled, the processor is configured to determine a vector magnitude and phase angle of a phase current increased by the ground fault current. The processor is also configured to determine a vector magnitude and phase angle of the ground fault current. The processor is further configured to correct the phase current increased by the ground fault current by a vector operation based upon the determined vector magnitudes and phase angles. The corrected phase current is then used to detect a fault condition in the power conductors.

Processor 36 is further configured to activate relay 38 upon detection of a fault condition. Upon activation of the relay 38, a relay switch (not shown) is opened and a trip signal is provided to contactor 44. The contactor 44 is configured to cause interruption of current flow through the power conductors 14, 16 and 18. The manner in which the processor detects a fault condition is described in further detail below.

Figure 2:
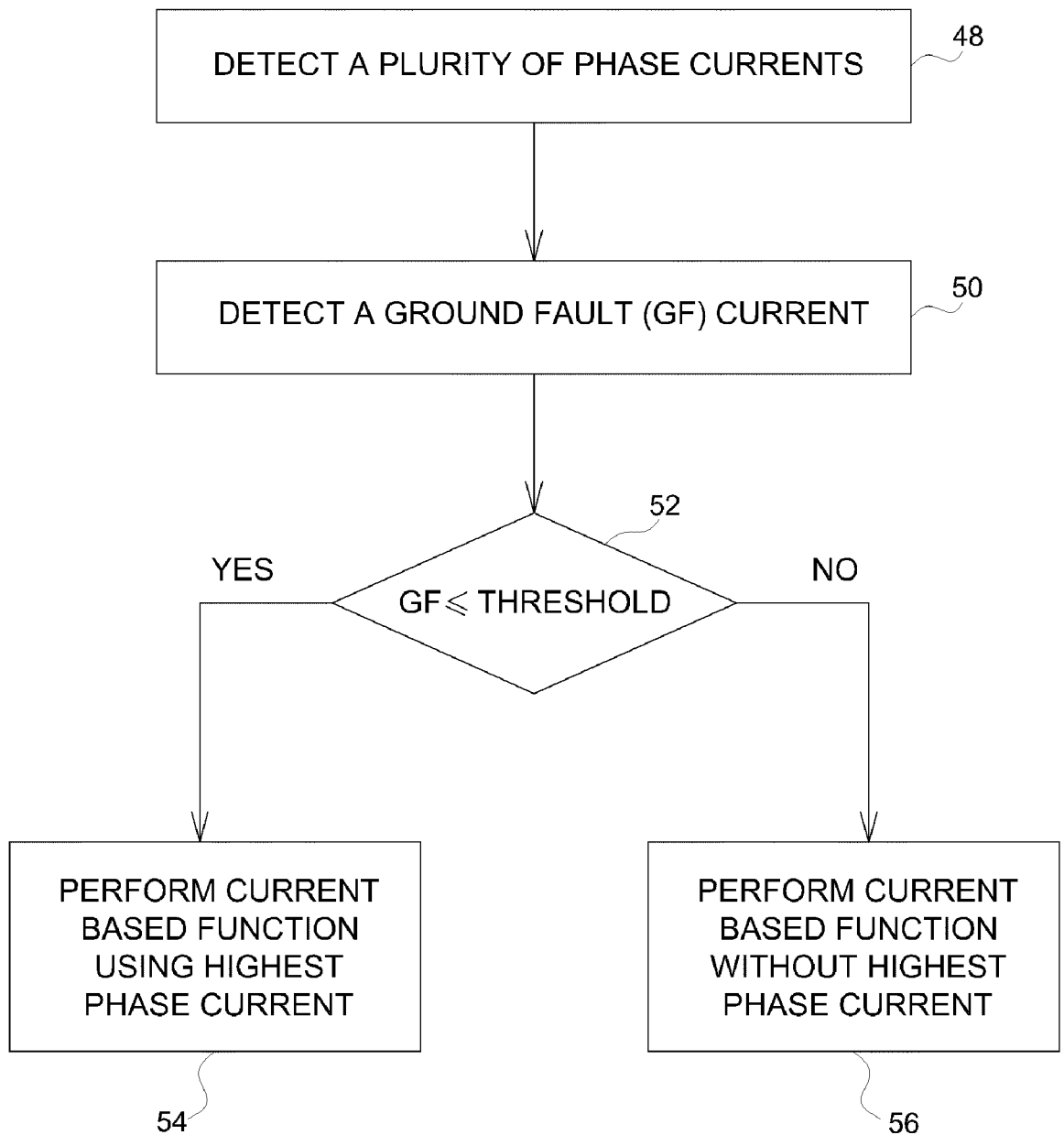
FIG. 2 is a flow chart illustrating a method for detecting a ground fault current in an overload relay.

FIG. 2 is a flow chart illustrating a method for detecting a ground fault current in an overload relay according to aspects of the invention. At step 48, a plurality of phase currents in a relay are detected. In one embodiment, the plurality of phase currents is detected using Hall effect sensors. At step 50, a ground fault current in the relay is detected.

At step 52, the ground fault current is compared to a threshold. In one embodiment, root mean square (rms) value of the ground fault current is used for the comparison with the threshold. Based on the comparison of the ground fault current to the threshold, current-based functions are performed by a processor. The processor may be positioned within the relay. Examples of current-based functions include phase loss analysis, current imbalance analysis, overload current analysis or overcurrent analysis.

In one embodiment, the threshold is substantially zero. In another embodiment, the threshold is user-selectable from among a plurality of predetermined threshold values. In a separate embodiment, the threshold is definable by a user within a predetermined range. A human interface module in communication with the relay may be used to configure the threshold.

When the ground fault current is at or below the threshold, a current-based function is performed based upon at least the highest phase current as indicated in step 54. If the ground fault current is greater than the threshold, the current-based function is performed without the highest phase current as shown at step 56. In one embodiment, the second highest phase current is used for performing the current-based function.

As described above the processor is configured to determine a fault condition by comparing the ground fault current to a threshold and performing a current-based function accordingly. However, the processor may also determine a fault condition by performing a vector analysis on the phase currents in the relay. The technique is described in further detail with reference to FIG. 3 below.

Figure 3:
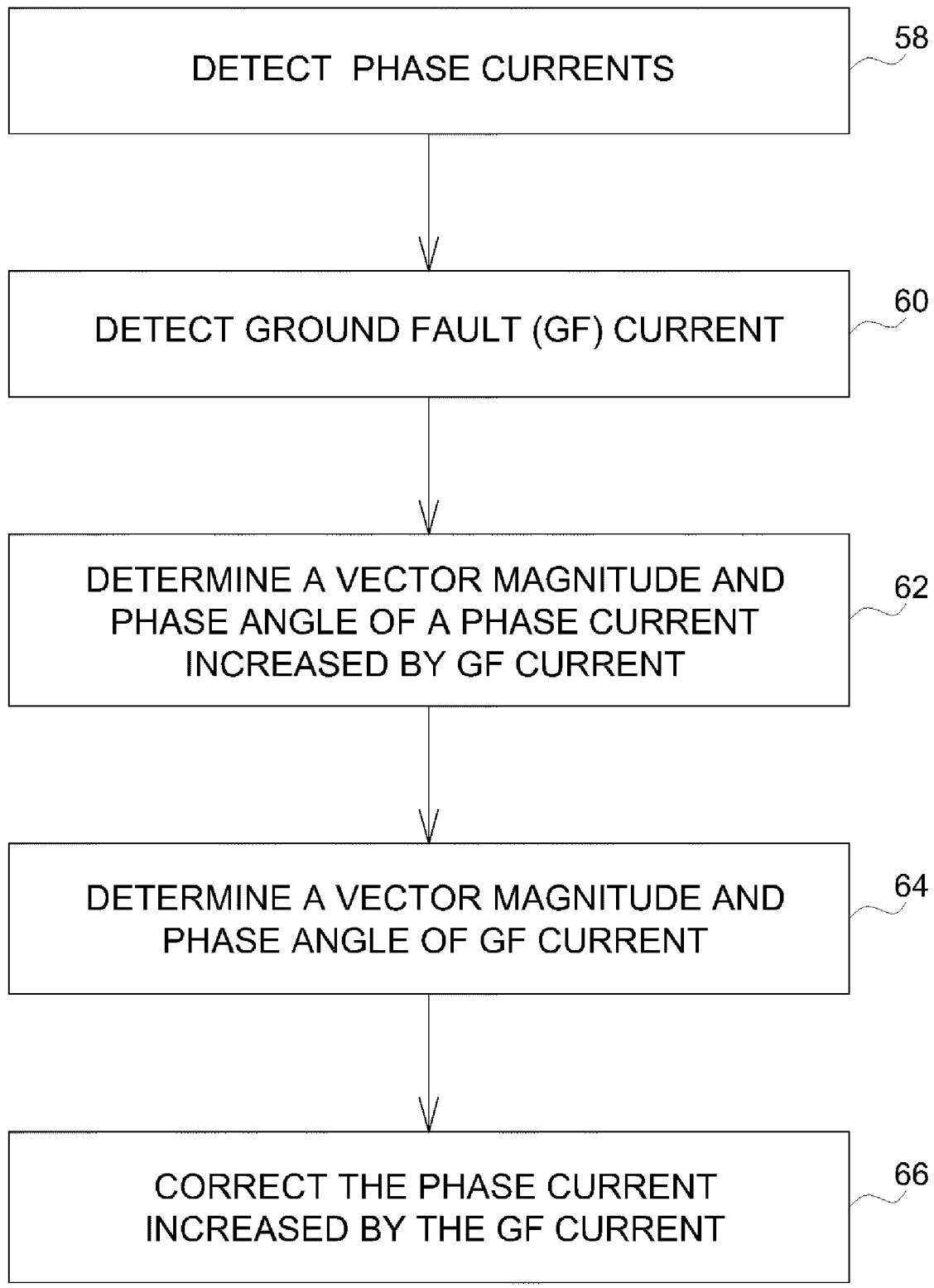
FIG. 3 is a flow chart illustrating a method for detecting and correcting a ground fault current in an overload relay.

FIG. 3 is a flow chart illustrating a method for detecting and correcting a ground fault current in an overload relay. At step 58, a plurality of phase currents in a relay are detected. In one embodiment, the plurality of phase currents is detected using Hall effect sensors.

At step 60, a ground fault current in the relay is detected. At step 62, a vector magnitude and phase angle of a phase current increased by the ground fault current is determined. At step 64, a vector magnitude and phase angle of the ground fault current is determined.

At step 66, the phase current increased by the ground fault current is corrected by using a vector operation based upon the determined vector magnitudes and phase angles. In one embodiment, the ground fault current vector is subtracted from the phase current vector increased by the ground fault current.

In one embodiment, the phase current correction is performed by a processor within the relay. In a further embodiment, the corrected phase current is used to perform the current-based function. The current-based function is performed by a processor to detect fault conditions. Examples of current-based function include phase loss analysis, current imbalance analysis, overload current analysis or overcurrent analysis.

The techniques described above have many advantages including minimizing nuisance tripping of the overload relay due to the presence of ground fault current. The technique also provides a more accurate overload determination since the ground fault current is filtered from the line current before it is used as an input to the activate the relay. These techniques may be used in a variety of power systems such as low current, high resistance ground systems and/or systems using low power motors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an electrical load, comprising:
    detecting a plurality of phase currents through a relay;
    detecting a ground fault current through the relay; and
    performing a current-based function based upon at least the highest phase current if a ground fault current is at or below a threshold, and performing the current-based function without the highest phase current if a ground fault current is above the threshold.

2. The method of claim 1, further comprising tripping the relay based upon the current-based function.

3. The method of claim 1, wherein the current-based function is performed by a processor within the relay.

4. The method of claim 1, wherein when substantially no ground fault current is detected, multiple phase currents, including the highest phase current, are used for the current-based function.

5. The method of claim 1, wherein when ground fault current above the threshold is detected, the second highest phase current is used for the current-based function.

6. The method of claim 1, wherein the current-based function includes phase loss analysis, current imbalance analysis, overload current analysis or overcurrent analysis.

7. The method of claim 1, wherein the threshold is substantially zero.

8. The method of claim 1, wherein the threshold is user-selectable from among a plurality of predetermined threshold values.

9. The method of claim 1, wherein the threshold is definable by a user within a predetermined range.

10. The method of claim 1, wherein the ground fault current is routed through a high resistive ground circuit.

11. The method of claim 1, further comprising enabling a ground fault current filter.

12. A method for controlling an electrical load, comprising:
    detecting a plurality of phase currents through a relay;
    detecting a ground fault current through the relay;
    determining a vector magnitude and phase angle of a phase current increased by the ground fault current;
    determining a vector magnitude and phase angle of the ground fault current; and
    correcting the phase current increased by the ground fault current by a vector operation based upon the determined vector magnitudes and phase angles.

13. The method of claim 12, further comprising tripping the relay based upon the current-based function.

14. The method of claim 12, wherein the phase current correction is performed by a processor within the relay.

15. The method of claim 12, further comprising enabling a ground fault current filter.

16. The method of claim 12, further comprising performing a current-based function using the corrected phase current.

17. The method of claim 16, wherein the current-based function includes phase loss analysis, current imbalance analysis, overload current analysis or overcurrent analysis.

18. The method of claim 17, wherein the current-based function is performed by a processor within the relay.

19. An electrical load control system, comprising:
    means for detecting phase currents through three electrical phases;
    means for detecting a ground fault current;
    a processor configured to perform a current-based function based upon at least one of the phase currents; and
    a filter configured to cause the processor, in performing the current-based function, to use a phase current increased by the ground fault current when the filter is not enabled, and to cause the processor not to use the phase current increased by the ground fault current when the ground fault current is at or above a threshold value and the filter is enabled.

20. The electrical load control system of claim 19, wherein the means for detecting phase currents comprises a relay.

21. The electrical load control system of claim 20, wherein the processor is configured to trip a relay based upon the current-based function.

22. The electrical load control system of claim 21, wherein the processor is positioned within the relay.

23. The electrical load control system of claim 19, wherein the processor is configured to use multiple phase currents, including the highest phase current, for the current-based function, when substantially no ground fault current is detected.

24. The electrical load control system of claim 19, wherein the processor is configured to use the second highest phase current for the current-based function, when ground fault current is above the threshold and the filter is enabled.

25. The electrical load control system of claim 19, wherein the current-based function includes phase loss analysis, current imbalance analysis, overload current analysis or overcurrent analysis.

26. The electrical load control system of claim 19, wherein the threshold is substantially zero.

27. The electrical load control system of claim 19, wherein the threshold is user-selectable from among a plurality of predetermined threshold values.

28. The electrical load control system of claim 19, wherein the threshold is definable by a user within a predetermined range.

29. The electrical load control system of claim 19, wherein the ground fault current is routed through a high resistive ground circuit.

30. An electrical load control system, comprising:
    means for detecting phase currents through three electrical phases;
    means for detecting a ground fault current;
    a processor configured to:
        determine a vector magnitude and phase angle of a phase current increased by the ground fault current,
        determine a vector magnitude and phase angle of the ground fault current; and
        correct the phase current increased by the ground fault current by a vector operation based upon the determined vector magnitudes and phase angles; and
    a filter configured to cause the processor, to perform the current-based function when enabled.

31. The system of claim 30, further comprising tripping a relay based upon the current-based function.

32. The system of claim 31, wherein the processor is present within the relay.

33. The system of claim 30, wherein the processor is configured to performing a current-based function using the corrected phase current.

* * * * *